United States Patent [19]

Kustka

[11] 4,411,000
[45] Oct. 18, 1983

[54] TIMING RECOVERY TECHNIQUE

[75] Inventor: George J. Kustka, Ocean, N.J.

[73] Assignee: Bell Telephone Laboratories, Incorporated, Murray Hill, N.J.

[21] Appl. No.: 185,017

[22] Filed: Sep. 8, 1980

[51] Int. Cl.³ ............................................. H04B 3/04
[52] U.S. Cl. ..................................... 375/11; 375/80; 333/18; 364/724
[58] Field of Search .................................. 375/11-15, 375/80; 333/18; 307/510, 511, 516; 364/724

[56] References Cited

U.S. PATENT DOCUMENTS

| 3,906,347 | 9/1975 | Motley et al. | 375/15 |
|---|---|---|---|
| 3,978,407 | 8/1976 | Forney, Jr. et al. | 375/15 |
| 4,004,226 | 1/1977 | Qureshi et al. | 375/15 |
| 4,245,345 | 1/1981 | Gitlin et al. | 375/15 |
| 4,285,061 | 8/1981 | Ho | 375/15 |
| 4,330,861 | 5/1982 | Impallomeni | 333/18 |

OTHER PUBLICATIONS

Gottfried, "Fractional Tap-Spacing Equalizer and Consequences for Clock Recovery in Data Modem," Aug. 1976, IEEE Transaction on Communications, vol. Com-24, No. 8, pp. 856-864.

Primary Examiner—Benedict V. Safourek
Assistant Examiner—Stephen Chin
Attorney, Agent or Firm—Ronald D. Slusky

[57] ABSTRACT

In a data receiver (100), sampling circuitry (120, 125) forms samples of a received data signal representing a succession of data symbols. The samples, which are formed at twice the symbol rate, are multiplied by respective ones of a queue of coefficients in a fractionally spaced equalizer (150). Further circuitry (155, 160, 165, 170) forms decisions in response to the resulting products as to the values of the transmitted symbols and generates error signals. The values of the coefficients are updated in the equalizer in response to the error signals. Timing recovery circuitry (230) within the equalizer periodically identifies the largest of the coefficients and either advances or retards the phase of the sampling circuitry depending on whether that coefficient is or is not within a predetermined portion of the queue. The magnitude of the amount by which the phase is advanced or retarded is determined by the position of the largest coefficient relative to the center of the coefficient queue.

42 Claims, 6 Drawing Figures

TIMING RECOVERY TECHNIQUE

BACKGROUND OF THE INVENTION

The present invention relates generally to data communications. The invention more particularly relates to timing recovery techniques used in data receivers which have automatic and/or adaptive equalizers.

Accurate reception of high-speed data signals transmitted over a bandlimited channel with unknown transmission characteristics requires the use of an automatic equalizer. The equalizer, which is resident in the receiver portion of a data set, or modem, is generally in the form of a transversal filter. Samples of the received data signal, referred to herein as line samples, are formed at a predetermined sampling rate. In a so-called T/2 equalizer, for example, the line samples are formed at twice the transmitted symbol rate. The line samples are applied to the transversal filter, in which each is multiplied by respective one of a queue of coefficients. The resulting products are added together and, if necessary, demodulated to generate a baseband signal, referred to herein as an equalizer output. The value of each equalizer output is used as the basis for forming a decision as to the value of a respective transmitted data symbol.

In addition, an error signal is formed equal to the difference between each equalizer output and a reference signal which represents its respective data symbol. In the so-called adaptive type of automatic equalizer, in particular, the reference signal is derived from above-mentioned decision. The error signal is used to update, or adapt, the transversal filter coefficient values in such a way as to minimize a measure of the channel-induced distortion—assumed to be primarily intersymbol interference—in the equalizer outputs.

An important equalizer operating parameter, in addition to the rate at which the line samples are formed, is their time occurrence with respect to the received signal. This parameter is referred to as the timing epoch. The coefficient values subsisting in the equalizer at any given time will yield accurate equalization only if the received signal is sampled at or near a particular set of time points on the received signal, i.e., only if it is sampled with the appropriate timing epoch. The frequencies of the transmitter and receiver clocks invariably differ from one another, if only by a very small amount. Over time, this frequency difference, if not compensated for, would cause the received signal to be sampled further and further away from the appropriate time points, i.e., with an increasingly erroneous timing epoch. As long as the sampling frequency is high enough, the equalizer does have the ability to compensate for this clock frequency difference (as long as it is not too large) via the coefficient update process. This is not an effective long-term solution, however, because the distribution of coefficient values will eventually become skewed to one end of the coefficient queue and equalizer performance will degrade sharply.

To deal with this problem, the receiver is conventionally provided with a so-called timing recovery circuit. The timing recovery circuit determines whether the line samples are being formed earlier (later) than they should be and, in response, adjusts the phase of the line sample forming circuitry such that the line samples are formed a little later (sooner) than they otherwise would. This phase adjustment process is referred to as retarding (advancing) the receiver timing or, alternatively, as retarding (advancing) the sampling phase. The amount by which the receiver timing is advanced or retarded is referred to herein as the timing adjustment increment.

A commonly used timing recovery technique is so-called envelope-derived timing recovery, disclosed, for example, in the *Bell System Technical Journal*, Vol. 54, p. 569 et seq, March, 1975. This technique extracts a symbol-rate tone from the received signal and uses the phase of that tone to control receiver timing. Envelope-derived timing recovery performs satisfactorily for many applications. In some situations, however—such as a narrow rolloff system—the recovered tone may be so weak that accurate timing recovery is not possible when random data is being received.

An alternative timing recovery technique, referred to herein as "coefficient tracking," controls receiver timing as a function of coefficient distribution within the queue. One such technique is disclosed in U.S. Pat. No. 4,004,226, issued Jan. 18, 1977 to S. U. H. Qureshi et al. A particular coefficient—typically at or near the queue midpoint—is designated as the one which should have the largest magnitude. Periodically, e.g., in each symbol interval, the coefficient which actually has the largest magnitude is identified. If it is found to be the designated coefficient, no timing adjustment is made. Otherwise, the receiver timing is advanced or retarded, as appropriate, by a predetermined fixed timing adjustment increment such that subsequent coefficient adaptation over a number of symbol intervals causes the magnitude of the designated coefficient to ultimately become the largest.

Another coefficient tracking timing recovery technique is disclosed in the co-pending U.S. patent application of R. D. Gitlin et al, Ser. No. 185,016 filed of even date herewith. In accordance with that technique, the coefficient queue is divided into front and back portions, only. That is, every coefficient is in one or the other portion and no one coefficient is designated to have the largest magnitude. When a reference coefficient, such as the largest coefficient, is found in the front portion, receiver timing is retarded. If it is found in the back portion, receiver timing is advanced. This causes the location of the reference coefficient to alternate (over a large number of symbol intervals) between two coefficients, one on either side of the boundary between the front and back portions of the coefficient queue.

The use of a timing adjustment increment which is fixed may require a design compromise. In particular, a fixed timing adjustment increment should be large enough to ensure accurate timing recovery when the transmitter/receiver clock frequency difference is at some predetermined anticipated maximum, i.e., the worst case. On the other hand, the equalizer performs best when the timing adjustment increment is just barely large enough to compensate for the frequency difference which actually obtains.

SUMMARY OF THE INVENTION

In accordance with the invention, the timing adjustment increment magnitude is variable rather than fixed. In particular a reference coefficient—illustratively the largest coefficient—is repetitively identified. As in prior art coefficient tracking arrangements, the location of that coefficient determines the direction (sign) of the timing adjustment. In accordance with the invention, however, the distance of that coefficient from some predetermined point in the coefficient queue—either, for example, a "center" coefficient or the boundary between two coefficients—determines the timing adjustment increment magnitude. Illustratively, the greater that distance, the larger the increment magnitude. This approach results in a near optimum timing adjustment increment for whatever clock frequency difference actually obtains.

DETAILED DESCRIPTION

Figure 1:
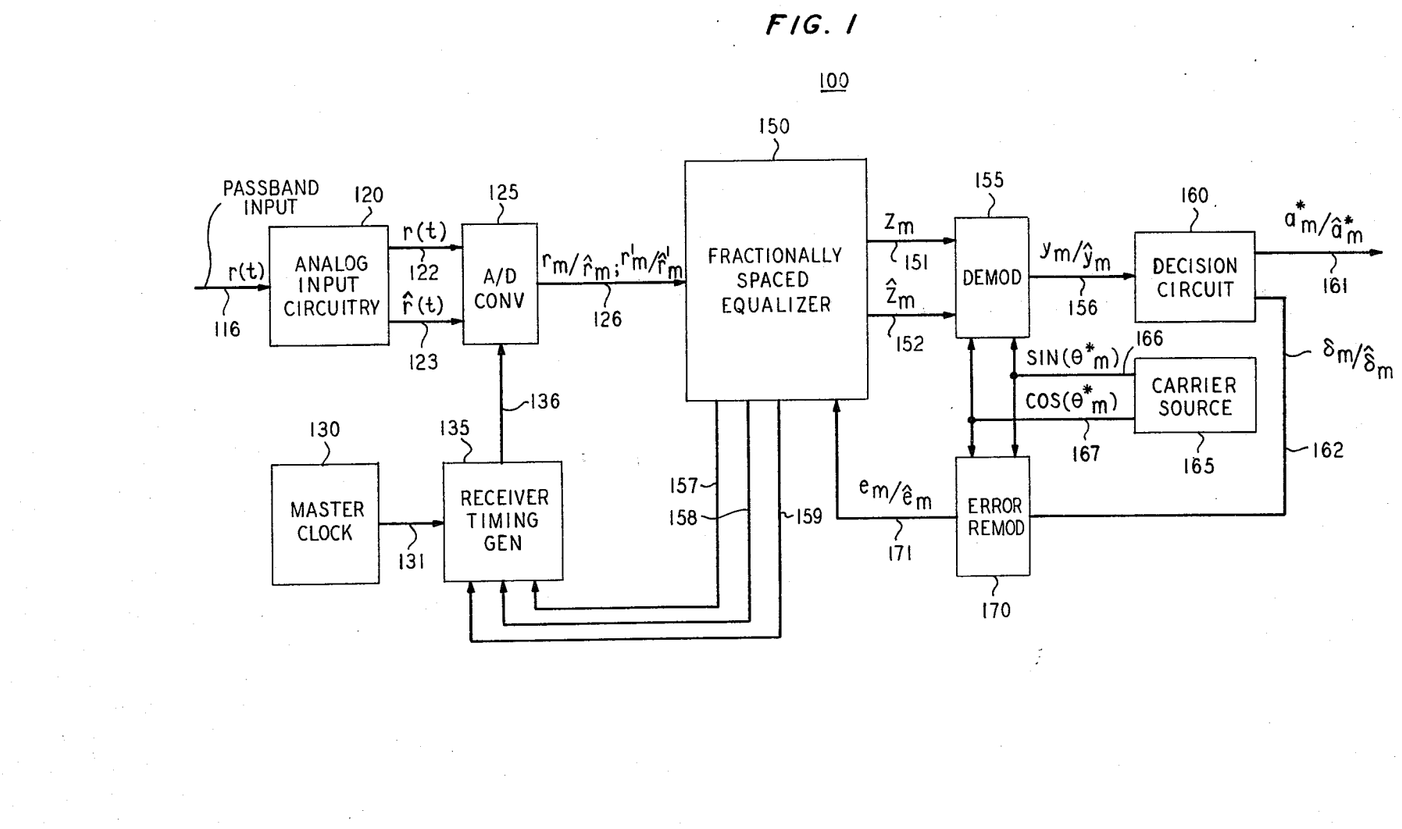
FIG. 1 shows an illustrative embodiment of a data signal receiver which includes timing recovery circuitry embodying the principles of the invention.

Receiver 100 shown in FIG. 1 is adapted for use in a voiceband data modem in a communication system employing quadrature-amplitude modulation (QAM). (The invention is, however, applicable to transmission systems using other modulation schemes as well as to baseband systems). In particular, four information bits, comprising a so-called data symbol, are communicated once every $T = 1/2400$ sec. The symbol rate is thus 2400 baud, yielding a binary data transmission rate of 9600 bits per second. The four bits to be transmitted are encoded into two signal levels, each of which can take on one of the four values $+1$, $-1$, $+3$, $-3$. The two signal levels amplitude modulate respective 1800 Hz in-phase and quadrature-phase carrier waves which, in combination, comprise the transmitted QAM signal.

The QAM signal, representing a succession of data symbols transmitted at a rate of $1/T$ symbols per second, is received by receiver 100 on lead 116. This passband input signal, $r(t)$, passes to analog input circuitry 120 comprised of a bandpass filter and Hilbert transform circuit. The output of circuitry 120 is comprised of a Hilbert transform pair $r(t)$ and $f(t)$ derived from the received passband signal. These are passed to an A/D converter 125 on leads 122 and 123.

A master clock 130 generates 128 master clock pulses every T seconds on lead 131. These are received by receiver timing generator 135. The latter counts the pulses on lead 131 and generates timing signals on a number of output leads to control the sequencing of the various signal processing functions within the modem. One of these leads shown explicitly is lead 136. The latter extends pulses to A/D converter 125 at a rate which causes A/D converter 125 to generate line samples at $p/T$ samples per second. The parameter p is illustratively equal to 2. A/D converter 125 thus generates two passband, i.e., modulated, line samples $R_m$ and $R_m'$ during the $m^{th}$ receiver symbol, interval. (An alternative way of generating $R_m$ and $R_m'$ is to first sample and digitize the received signal at a rate at least equal to twice its highest frequency component and then pass the resulting signal through a digital phase-splitter.)

QAM signals are conveniently expressed and processed as complex numbers, each having a real and imaginary component. The real and imaginary components of the line samples formed by A/D converter 125 are provided one after the other in serial form as separate ten-bit digital signals, or words, on lead 126. (Each of the other signal leads similarly carries its signals in serial form.) Notationally, the real and imaginary components of sample $R_m$ are represented as $r_m$ and $f_m$. Those of sample $R_m'$ are represented as $r_m'$ and $f_m'$.

Line samples $R_m$ and $R_m'$, which are spaced $T/2$ seconds apart, are equalized by fractionally spaced equalizer 150 described hereinbelow. It suffices to say for the present that the outputs of equalizer 150 on leads 151 and 152 are generated once per symbol interval and are, respectively, the real and imaginary components $z_m$ and $\hat{z}_m$ of a passband equalizer output $Z_m$. (It should be noted at this point that, due to processing delay in equalizer 150, passband equalizer output $Z_m$ is not necessarily generated during the $m^{th}$ receiver interval, the latter being defined as the T second interval during which line samples $R_m$ and $R_m'$ are generated. The subscript m in "$Z_m$" thus does not identify when $Z_m$ is generated but, rather, identifies $Z_m$ as being the passband equalizer output which is generated as the result of the application of line samples $R_m$ and $R_m'$ to the equalizer. Similar considerations apply, for example, to signals $Y_m$, $A_m^*$, $\Delta_m$ and $E_m$ discussed below.)

Passband equalizer output $Z_m$ is demodulated to baseband by demodulator 155. The demodulated output of demodulator 155 is baseband equalizer output $Y_m$. Baseband equalizer output $Y_m$ is hereinafter referred to as equalizer output $Y_m$. It has real and imaginary components $y_m$ and $\hat{y}_m$, provided one after the other as twelve-bit words on lead 156. The demodulation process performed by demodulator 155 is expressed in complex notation as $$Y_m = Z_m e^{-j\theta^*_m}$$

where $\theta_m^*$ is an estimate of the carrier phase. For purposes of generating $Y_m$ in accordance with the above expression, demodulator 155 receives the nine-bit digital representations of $\sin(\theta_m^*)$ and $\cos(\theta_m^*)$ on output leads 166 and 167 of carrier source 165.

Components $y_m$ and $\hat{y}_m$ are quantized in decision circuit 160. The resulting outputs, provided one after the other on lead 161, are decisions $a_m^*$ and $\hat{a}_m^*$ as to the signal levels which represent components $a_m$ and $\hat{a}_m$ of a particular transmitted symbol $A_m$. Decisions $a_m^*$ and $\hat{a}_m^*$ can be thought of as the real and imaginary components of a complex decision $A_m^*$.

Decision circuit 160 also provides, on lead 162, the real and imaginary components, $\delta_m$ and $\hat{\delta}_m$, of a complex baseband error signal $\Delta_m$ associated with the data symbol in question. Error signal $\Delta_m$ is equal to the quantity $(Y_m - A_m^*)$. In particular, $\delta_m = (y_m - a_m^*)$ and $\hat{\delta}_m = (\hat{y}_m - \hat{a}_m^*)$, with $\delta_m$ and $\hat{\delta}_m$ being expressed as respective twelve-bit words. Error signal $\Delta_m$ is remodulated in error remodulator 170 to yield a remodulated, or passband, error signal $E_m$ given by $$E_m = \Delta_m e^{+j\theta^*_m}.$$

In order to form the remodulated error signal, remodulator 170, like demodulator 155, receives $\sin(\theta_m^*)$ and $\cos(\theta_m^*)$ from carrier source 165.

(An alternative way of generating error signal $E_m$ would be to remodulate complex decision $A_m{}^*$ and subtract it from passband equalizer output $Z_m$. In either case, the value of $E_m$ is the same, it being equal to the difference, modulated at the carrier frequency, between the pre- and post-quantized values of equalizer output $Y_m$.)

Real and imaginary components $e_m$ and $e_m$ of error signal $E_m$ are extended one after the other to fractionally spaced equalizer 150 on lead 171 for purposes of coefficient updating, as described below.

Figure 2:
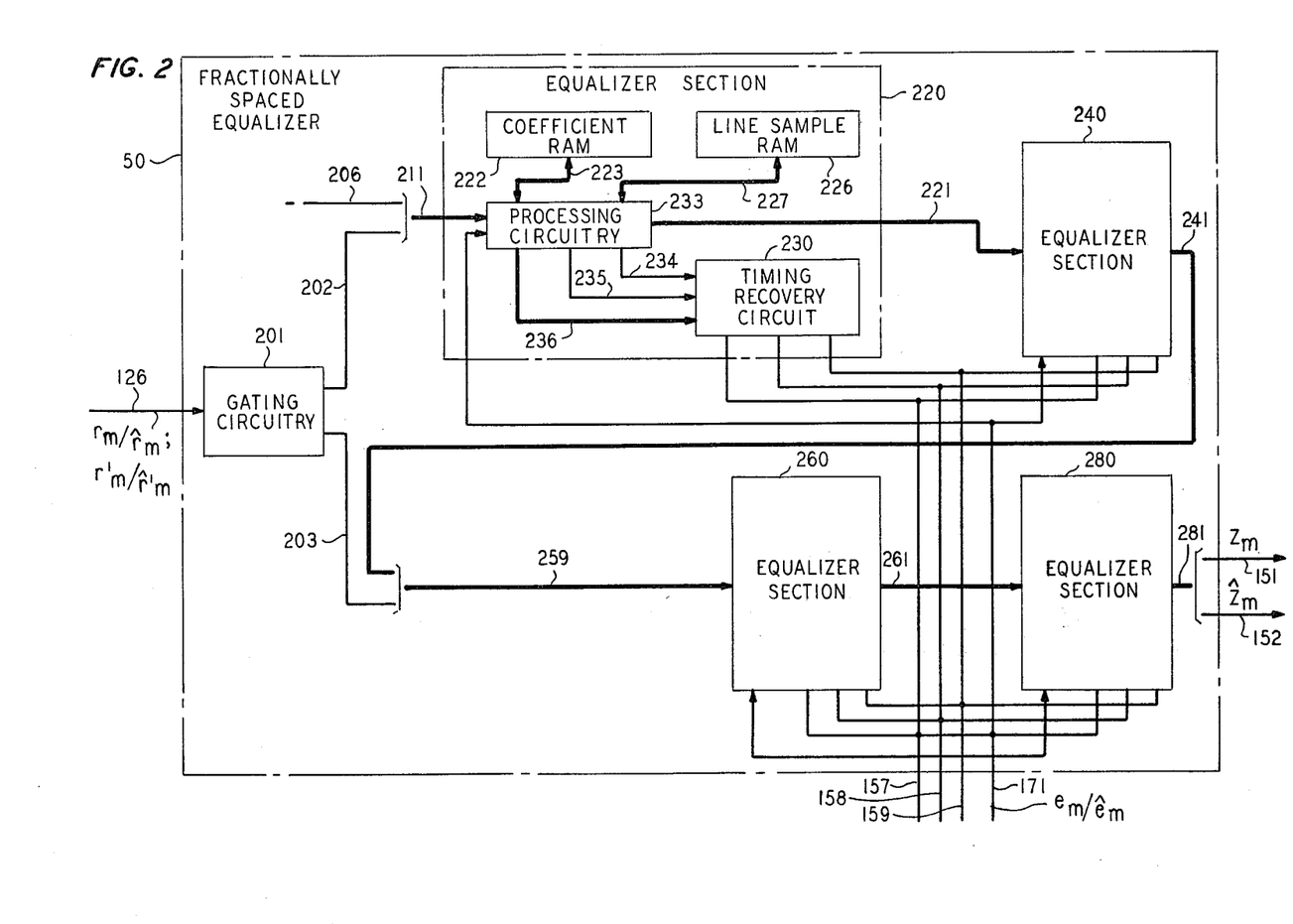
FIG. 2 shows a fractionally spaced equalizer used in the receiver of FIG. 1.

As shown in FIG. 2, fractionally spaced equalizer 150 is comprised of four substantially identical equalizer sections 220, 240, 260 and 280. Each equalizer section holds at least $(M+d)$ complex line samples, where M is a selected integer, such as 16, and d is no less than the number of symbol intervals which elapse between the generation of line samples $R_m$ and $R_m'$ and the generation of error signal $E_m$. The d extra line samples are needed for coefficient updating, as set forth below. Illustratively, $d=2$.

Equalizer 150 also includes gating circuitry 201, which receives line samples $R_m$ and $R_m'$ on lead 126. The former is held in gating circuitry 201 until the latter is received. Line sample $R_m$ is then extended via lead 202 of a cable 211 to equalizer section 220. Line sample $R_m'$ is concurrently extended via lead 203 of a cable 259 to equalizer section 260. The oldest samples in equalizer sections 220 and 260—$R_{m-(M+d)}$ and $R'_{m-(M+d)}$—are discarded. In addition, each of equalizer sections 220 and 260 transfers the $M^{th}$ oldest line sample stored therein—$R_{m-M}$ and $R'_{m-M}$, respectively—to equalizer sections 240 and 280 via leads within cables 221 and 261, respectively. Equalizer sections 240 and 280 store these line samples and discard their oldest lines samples $R_{m-(2M+d)}$ and $R'_{m-(2M+d)}$, respectively.

For each symbol interval, each of the equalizer sections multiplies the M newest, i.e., most-recently-formed, line samples stored therein by respective complex coefficients stored therein and forms the sum of the resulting products, referred to as a partial sum. The four partial sums are then added together to form equalizer output $Z_m$ previously described.

In particular, equalizer sections 220, 240, 260 and 280 respectively form the partial sums $$\sum_{i=1}^{M} C_i(m)R_{m-i+1}, \quad \sum_{i=M+1}^{2M} C_i(m)R_{m-i+1}, \quad \sum_{i=1}^{M} C'_i(m)R'_{m-i+1} \text{ and}$$

$$\sum_{i=M+1}^{2M} C'_i(m)R'_{m-i+1}.$$

In these expressions the $C_i(m)$'s and $C_i'(m)$'s are the above-mentioned complex coefficients. Each coefficient has a particular value associated with the $m^{th}$ receiver symbol interval and, as can be seen from the above expressions, each coefficient is multiplied by a line sample which bears a predetermined temporal relationship to the most recently formed line sample. Thus, for example, coefficient $C_1'(m)$ is always multiplied by the most recently formed line sample $R_m'$; coefficient $C_1(m)$ is always multiplied by the second most recently formed line sample $R_m$, and so on.

Equalizer section 220 thereupon transfers the real and imaginary components of its partial sum to section 240 in serial form via separate leads in cable 221. Equalizer section 240 adds this to its own partial sum and passes the resulting real and imaginary components to section 260 via cable 241 and so on. To begin the process, a "dummy" partial sum, equal to zero, is applied to equalizer section 220 (by circuitry not shown) over lead 206 of cable 211. (Since addition is a commutative operation, the partial sums generated by the four equalizer sections can be added in any order desired.) The ultimate equalizer output components $z_m$ and $\hat{z}_m$ are provided by section 280 on leads 151 and 152 of a cable 281.

Each equalizer section then updates the coefficient values stored therein to provide coefficient values associated with the $(m+1)^{st}$ symbol interval. The updating rule illustratively used in equalizer sections 220 and 240 is $$C_i(m+1) = C_i(m) - \alpha E_{m-d}R_{m-i-d+1} - \alpha\mu SGN[C_i(m)]$$

and that illustratively used in sections 260 and 280 is $$C'_i(m+1) = C'_i(m) - \alpha E_{m-d}R'_{m-i-d+1} - \alpha\mu SGN[C'_i(m)],$$

where d is as defined above, $\alpha$ and $\mu$ are selected constants, and the value of the complex function $SGN[X]$ is $\pm 1 \pm j$ depending on the signs of the real and imaginary components of its complex argument X. In order to implement these updating rules—which embody the so-called mean-squared updating algorithm, modified in accordance with the tap leakage technique taught in commonly-assigned U.S. patent application of R. D. Gitlin et al, Ser. No. 16,495 filed Mar. 1, 1979, now U.S. Pat. No. 4,237,554 issued Dec. 2, 1980—each equalizer section receives the real and imaginary error signal components $e_m$ and $e_m$ provided on lead 171.

The principles of the present invention will now be explained with reference to FIGS. 3–5, each of which depicts the transversal filter coefficients in an ordered plurality or queue. The order of the coefficients within the queue is defined by the order of occurrence of the line samples which these coefficients multiply. Thus, for example, coefficients $C_1'(m)$, $C_1(m)$ and $C_2'(m)$ are the first three coefficients in the queue since they respectively multiply most recently formed line sample $R_m'$, the second-most-recently-formed line sample $R_m$ and the third-most-recently-formed line sample $R'_{m-1}$.

Figure 3:
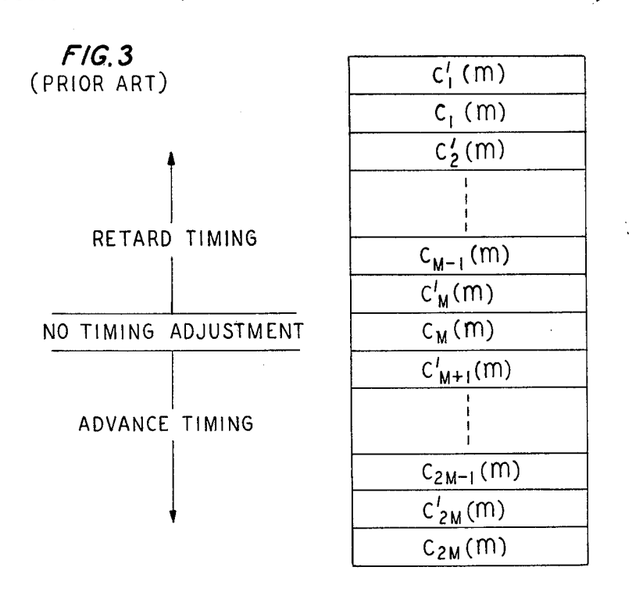
FIG. 3 depicts the above-described Qureshi et al coefficient tracking timing recovery technique.

FIG. 3, in particular, depicts the timing recovery technique disclosed in the above-cited Qureshi et al patent. A particular coefficient—illustratively coefficient $C_M(m)$—is designated as one which should have the largest magnitude. This coefficient may be referred to as the "center" coefficient (although it need not be precisely in the center of the coefficient queue). The coefficients preceding coefficient $C_M(m)$, i.e., coefficients $C_1'(m) \ldots C_M'(m)$ are said to be in the "front" of the queue and are multiplied by the more recently formed line samples. Those succeeding coefficient $C_M(m)$, i.e., coefficients $C'_{m+1}(m) \ldots C_{2M}(m)$ are said to be in the "back" of the queue, and are multiplied by the less recently formed line samples.

At regular intervals, e.g., in each symbol interval, the coefficient having the largest magnitude is identified. If it is found to be coefficient $C_M(m)$, no timing (phase) adjustment is made. If it is found to be in the front of the coefficient queue, this indicates that receiver timing (also referred to as the sampling phase) is to be retarded so that subsequent line samples are formed a little later than they would be if the timing adjustment had not been made. If it is found to be in the back of the queue, this indicates that receiver timing is to be advanced, so that subsequent line samples are formed a little sooner than they would be if the timing adjustment had not been made. In either case, the coefficient values adapt in response to the timing adjustment, the adaptation being such that the magnitude of coefficient $C_M(m)$ increases and ultimately becomes the largest. If, as the result of subsequent coefficient adaptation, coefficient $C_M(m)$ ceases to have the largest magnitude, further timing adjustments are made to again provide it with the largest magnitude. Thus, in typical steady state operation, any one of three coefficients can have the largest magnitude, i.e., the center coefficient and the ones on either side of it.

Figure 4:
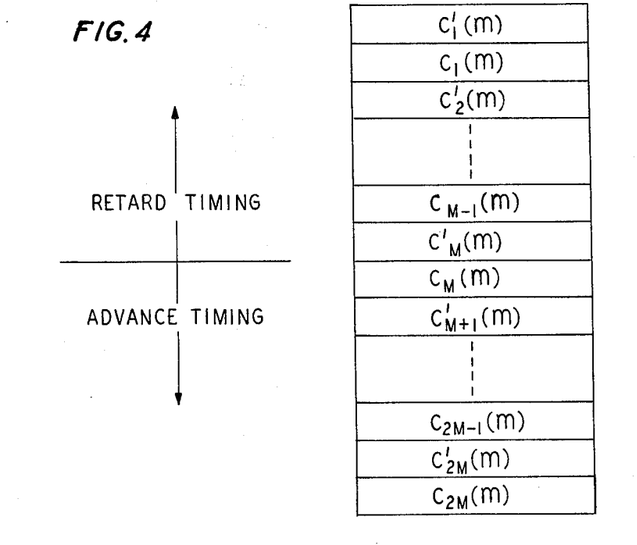
FIG. 4 depicts the above-described Gitlin et al coefficient tracking timing recovery technique.

FIG. 4 depicts the timing recovery technique disclosed in the above-cited Gitlin et al patent application. There is no center coefficient. Rather, the coefficient queue is divided into two portions only—a front of the queue illustratively comprising coefficients $C_1'(m)$ through $C_M'(m)$ and a back of the queue illustratively comprising coefficients $C_M(m)$ through $C_{2M}(m)$. Whichever portion of the queue a reference coefficient—illustratively the coefficient having the largest complex magnitude—is found in, receiver timing is adjusted such that the resulting coefficient adaptation causes the reference coefficient to ultimately appear in the other portion. If, in particular, the reference coefficient is found to be in the front of the queue, this indicates that receiver timing is to be retarded. Conversely, if it is found to be in the back of the queue, this indicates that receiver timing is to be advanced. As a result of this approach, the reference coefficient alternates (over a large number of symbol intervals) in typical steady state operation between only two coefficient locations, one on either side of the boundary between the front and back of the coefficient queue typically the coefficients right at the boundary, i.e., coefficients $C_M'(m)$ and $C_M(m)$.

In the above-described coefficient tracking timing recovery techniques, the magnitude of the timing adjustment increment, i.e., the amount by which timing is advanced or retarded, is fixed. This requires a design compromise. The timing adjustment increment should be large enough to ensure accurate timing recovery when the transmitter/receiver clock frequency difference is at some predetermined anticipated maximum, i.e., the worst case. On the other hand, the equalizer performs best when the timing adjustment increment is just barely large enough to compensate for the frequency difference which actually obtains.

These competing considerations are reconciled in accordance with the present invention. In particular, the magnitude of the timing adjustment increment is selected as a function of the location of the reference coefficient; the greater its distance from a reference location, e.g., a "center" coefficient (as in FIG. 3), or the boundary between two coefficients (as in FIG. 4), the larger the increment. This approach results in a near optimum timing adjustment increment no matter what the clock frequency difference.

Figure 5:
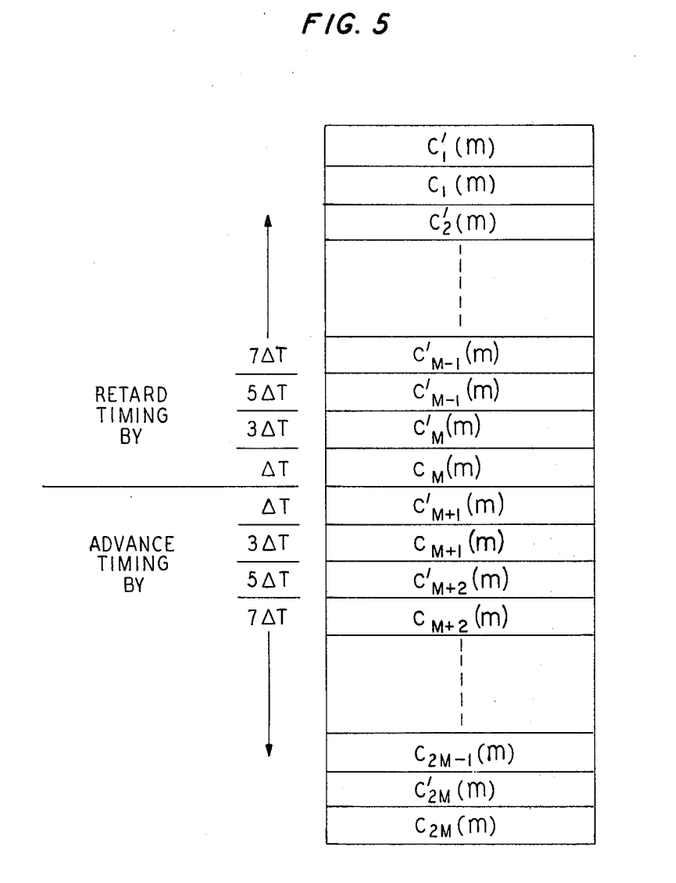
FIG. 5 illustrates the principles of the present invention in the context of the Gitlin et al coefficient tracking timing recovery technique.

In particular, FIG. 5 depicts the coefficient tracking timing recovery technique of Gitlin et al with the timing adjustment increment being selected in accordance with the principles of the present invention. More particularly, FIG. 5 shows that over a range of distances from the reference location, the latter illustratively being the boundary between coefficients $C_M(m)$ and $C'_{M+1}(m)$, the magnitude of the increment is an increasing function of the distance between the location of the reference coefficient and the reference location.

Specifically, if the reference coefficient is or coefficient $C_M(m)$ or coefficient $C'_{M+1}(m)$, timing is to be respectively retarded or advanced by an increment, or amount, $\Delta T$. If the reference coefficient is coefficient $C_M'(m)$ or $C_{M+1}(m)$, timing is to be respectively retarded or advanced by a greater increment, $3\Delta T$, and so forth. As in the fixed magnitude timing adjustment increment arrangement of Gitlin et al, this approach results in steady state operation wherein the reference coefficient alternates between two locations. However, depending on the magnitude of the clock frequency difference, these two coefficient locations may not be the locations of coefficients $C_M(m)$ and $C'_{M+1}(m)$, as as is typical in the fixed but any pair of coefficient locations between, in this example, $C_{M-1}(m)$ and $C_{M+2}(m)$. (Again, the two locations between which the reference coefficient alternates are typically adjacent, although they are not necessarily so.) As long as the coefficient queue is long enough, the fact that the reference coefficient is maintained somewhat displaced from the actual center of the queue does not have a deleterious effect on equalizer performance.

Timing recovery control circuitry which controls receiver timing generator 135 in the manner depicted in FIG. 5, is contained within equalizer 150, as described in detail below. As shown in FIG. 1, in particular, this circuitry provides timing control signals to receiver timing generator 135 over leads 157–159. The signal on lead 159, in particular, is a bit indicating whether timing is to be advanced or retarded. The signals on leads 157 and 158 comprise a two-bit word indicating whether the magnitude of the timing adjustment increment is to be $\Delta T$, $3\Delta T$, $5\Delta T$, or $7\Delta T$.

Receiver timing generator 135 may actually adjust the sampling phase in response to each set of signals on leads 157–159. Alternatively, an advance (retard) timing adjustment may be made when the number of advance (retard) signals generated on lead 159 since the last timing adjustment was made exceeds the number of retard (advance) signals by a predetermined amount greater than unity, e.g., 6. When it is determined that a timing adjustment is to be made, the timing adjustment increment magnitude may be, for example, that most recently indicated on leads 157–158. This approach is advantageous, for example, in that it, in effect, reduces the average timing adjustment increment magnitude and thereby minimizes the possibility of overcorrection. In addition, it precludes any timing adjustment if the reference coefficient is alternating rapidly between the front and back portions of the queue; this is an indication that the transmitter and receiver clock frequencies are substantially equal and, thus, no timing adjustment is really necessary.

The timing adjustment may be made by the receiver timing generator in one step equal to the timing adjustment increment. Preferably, however, it is made in small steps over a number of symbol intervals. For example, the timing adjustment increment may be distributed over seven consecutive symbol intervals. If the increment is $7\Delta T$, a timing adjustment step of $\Delta T$ is made in each of the intervals. If it is $5\Delta T$, five timing adjustment steps of $\Delta T$ are made, with the five steps being distributed as uniformly as possible over the seven intervals, e.g., in the first, third, fourth, fifth and seventh intervals, etc. This approach is preferable because it minimizes the effect of timing adjustments on other receiver processes. (Of course, the timing adjustment increment may be distributed over more (or less) than seven intervals, which need not be consecutive.)

As indicated above, the reference coefficient is, in the present illustrative embodiment, the coefficient having the largest complex magnitude. In other embodiments, however, the reference coefficient may be the coefficient having (a) the largest real component, (b) the largest imaginary component (c) the largest real or imaginary component, or (d) some other predetermined characteristic not directly related to magnitude. Use of the largest complex magnitude has been found to be preferable in that the complex magnitude of an equalizer coefficient, unlike the respective magnitudes of its components, does not change with shifts in received carrier phase. Thus such shifts will not interfere with the timing recovery process.

Attention is now redirected to FIG. 2 which, by way of example, shows the constituents of equalizer section 220. Its line samples and coefficients are stored in line sample random access memory (RAM) 226 and coefficient RAM 222, respectively. The actual signal processing, including coefficient updating, is performed by processing circuitry 233. The latter communicates with RAMs 222 and 226 via cables 223 and 227, respectively, and also receives the error signal on lead 171. Circuitry 233 also includes input/output circuitry for RAMs 222 and 226.

Equalizer section 220 further includes a timing recovery circuit 230. This unit has three output leads each connected to a respective one of timing recovery control leads 157-159. As described in detail hereinbelow, timing recovery circuit 230 identifies in each symbol interval the coefficient stored within RAM 222 which has the largest complex magnitude. It also determines the location of that coefficient in the queue relative to the other coefficients stored in RAM 222. To this end, timing recovery circuit 230 receives from processing circuitry 233 real and imaginary coefficient components on leads 234 and 235 and coefficient RAM addresses on lead 236.

Each of the timing recovery circuits in the other three equalizer sections operates in the same way as, and concurrently with, circuit 230 to identify the coefficient within its respective equalizer section having the largest complex magnitude and to determine the location of that coefficient relative to the other coefficients stored in that equalizer section. All four timing recovery circuits then determine amongst themselves, via an arbitration process to be described, which of them holds the largest complex coefficient magnitude over all. The timing recovery circuit determined to hold the largest squared magnitude takes control of leads 157-159 and, as a function of the location of that coefficient within the overall coefficient queue of FIG. 5, provides on leads 157-159 the appropriate timing control signals.

Figure 6:
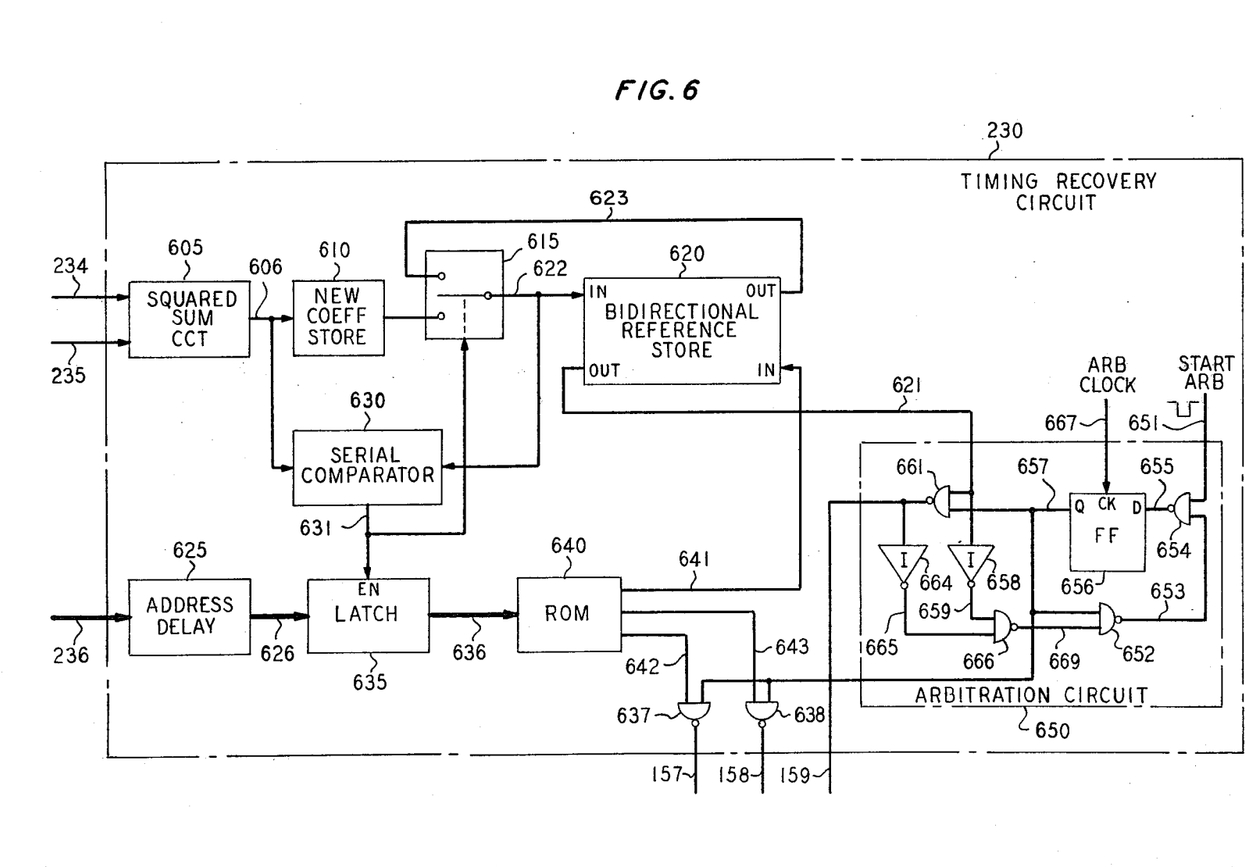
FIG. 6 shows one of four substantially identical timing recovery circuits used in the equalizer of FIG. 2.

FIG. 6 shows an illustrative realization of timing recovery circuit 230. The 12-bit real and imaginary components of each coefficient are clocked concurrently into squared magnitude circuit 605 of circuit 230 from leads 234 and 235, respectively. Circuit 605 provides on lead 606 a 12-bit number representing the sum of the squares of the real and imaginary components clocked in from leads 234 and 235, referred to herein as the "squared magnitude." (The magnitude of a complex number is equal to the square root of the sum of the squares of its real and imaginary components. However, since the coefficient magnitudes, per se, are not of interest, but only the location of the coefficient having the largest magnitude, it is sufficient to use the sum, i.e., the squared magnitude, without taking the square root. Moreover, if a particular coefficient component is greater than unity, its square may be approximated by its absolute value in forming the squared magnitude. This approach may result in occasional slight errors but, advantageously, avoids having to provide storage capability for large numbers.) Circuit 605 may be realized, for example, as an arithmetic circuit or as a read-only memory look-up table.

Circuit 230 further includes new and reference coefficient stores 610 and 620, respectively. Both stores are illustratively shift registers whose contents are initially cleared. Store 620, in particular, is a bidirectional shift register which is operated in a shift-right mode at this time. Circuit 230 also includes a serial comparator 630. As the bits of each squared magnitude are clocked serially out of circuit 605 onto lead 606, they are concurrently clocked into both store 610 and a first input of comparator 630. At the same time, the contents of store 620, representing the largest squared magnitude thus far provided by circuit 605 in the current receiver symbol interval, are read out onto lead 623.

Lead 623 extends to a switch 615. Although the latter is represented as a mechanical device to facilitate explanation, it is, in actuality, a gating circuit of conventional design. Assuming that switch 615 is in the up position, the squared magnitude on lead 623 is read back into store 620 via lead 622 and is also applied via that lead to the second input of comparator 630. The output signal of comparator 630 is held in a latch internal thereto and is provided on lead 631. If the squared magnitude most recently on lead 606 is not as large as that read out of stored 620, comparator output lead 631 is low, i.e., in the "0" state. This causes switch 615, the position of which is controlled by the lead 631 signal, to be maintained in the up position as previously assumed. Thus, the squared magnitude in store 620 will again be read back into that store when the next comparison is made.

If, on the other hand, the squared magnitude most recently on lead 606 is larger than that read out of store 620, lead 631 is high, i.e., in the "1" state. This causes switch 615 to be in the down position. Thus, as the next squared magnitude is clocked into store 610 and comparator 630, it will be compared not to the squared magnitude in store 620, but, rather, to that previously stored in store 610 and now extended to comparator 630 via switch 615 and lead 622. In addition, store 620 will now receive as its input the squared magnitude previously stored in store 610, so that that magnitude will be the one to which the subsequent squared magnitude provided by circuit 605 is compared.

Thus, once all of the coefficients stored in RAM 222 have been processed, reference store 620 holds the largest squared magnitude for those coefficients.

Circuit 230 also includes address delay 625 and latch 635. As each coefficient is presented to circuit 605, its address, i.e., its location within the queue of coefficients stored in equalizer section 220, is presented via lead 236 to delay 625. The delay imparted by the latter is equal to the processing delay in circuit 605 so that as each squared magnitude is presented to new coefficient store 610, its address is concurrently presented to latch 635. Whenever comparator 630 operates switch 615 via lead 631 to cause a new squared magnitude to be entered into reference store 620, it also enables latch 635 via its input EN to read in and store the associated address.

Timing recovery circuit 230 also includes read-only memory (ROM) 640 which receives in parallel form over cable 631 the address stored in latch 635. Although not shown in FIG. 6, ROM 640 also receives signals which are hard-wired at the time of manufacture to indicate the position of the coefficients stored in RAM 222 within the overall coefficient queue of FIG. 5. In this example, all of the coefficients are in the front of the queue.

Based on the signals provided to it, ROM 640 generates on its output leads 641, 642 and 643 the timing recovery control signals which should be provided on leads 159, 157 and 158, respectively, if reference store 620 were, in fact, to hold the largest squared magnitude within all four timing recovery circuits. In particular, lead 641 carries the advance/retard signal and leads 642 and 643 carry the timing adjustment increment magnitude.

During the determination of largest squared coefficient magnitude, store 620 operates in a shaft-right mode, as previously noted. Thus, the least- (most-) significant bit of the squared magnitude stored therein is in the right-most (left-most) stage. When the above-mentioned arbitration among the four equalizer sections to determine which holds the largest squared magnitude begins, store 620 is operated in a shift-left mode so that the bits of the squared magnitude stored therein are extended most-significant-bit first to arbitration circuit 650 via lead 621. As each bit is applied to arbitration circuit 650, the corresponding bits of the squared magnitudes stored in the other three timing recovery circuits are concurrently extended to their associated arbitration circuits.

The arbitration circuit of each of the four timing recovery circuits is connected to lead 159, which is normally high. As each bit of the squared magnitude in store 620, for example, is extended to circuit 650, the latter responds by pulling lead 159 low if that bit is a "1" and if, furthermore. circuit 650 has not as yet dropped out of the arbitration. If, on the other hand, that bit is a "0" but lead 159 is pulled low by another one of the timing recovery circuits, circuit 650 drops out of arbitration, i.e., it will no longer pull lead 159 low for the duration of the current arbitration, because this indicates that the squared magnitude stored in the reference store within another timing recovery circuit is larger than that stored in reference store 620.

More particularly, at the start of arbitration, input lead 651 of circuit 650 is pulled low (by circuitry not shown). Thus, the output of NAND gate 654 on lead 655 is high. As each bit is clocked out of store 620, D-type flip-flop 656 is clocked by an arbitration clock pulse on lead 667, which extends from circuitry not shown, so that the high state on lead 655 is stored in the flip-flop and provided at its Q output on lead 657. Lead 651 is thereafter returned to the high state.

Assume that the above-mentioned first bit clocked out of reference store 620 is a "1". The output of NAND gate 661 on lead 159 is thus low. Any of the other three arbitration circuits which receive a "0" from their respective reference stores drop out of the arbitration at this point, i.e., inhibit themselves from pulling lead 159 low; the low state of lead 159 indicates to any such circuits the reference store in at least one other timing recovery circuit—in this case circuit 230—holds a larger squared magnitude.

Since lead 621 is high, the output of inverter 658 on lead 659 is low and thus the output of NAND gate 666 on lead 669 is high. Since lead 657 is also high, the output of NAND gate 652 on lead 653 is low. Thus, the output of NAND gate 654 on lead 655 is high. Lead 657 thus remains high when flip-flop 656 is clocked in concurrence with the appearance on lead 621 of the second-most-significant bit of the squared magnitude in store 620.

Assume that that second-most-significant bit is a "0" but that the second-most-significant bit of the squared magnitude stored in each of the other timing recovery circuits still in the arbitration is also "0". Lead 159 thus remains high so that the output of inverter 664 on lead 665 is low and the output of NAND gate 666 on lead 669 is high. Thus, leads 653 and 655 are high. Accordingly, lead 657 is still high when flip-flop 656 is clocked in concurrence with the appearance of the third-most-significant squared magnitude bit on lead 621.

Assume, on the one hand, that that third-most-significant bit is a "0" but the third-most-significant bit of the squared magnitude stored in another timing recovery circuit still in the arbitration, is "1". This means that the squared magnitude in store 620 is not the largest and that circuit 650 should drop out of the arbitration. In particular, both inputs to gate 666 are now both high so that lead 669 is low, causing the output of gate 652 on lead 653 to be high. Since lead 651 is also high, lead 655 is low. During arbitration with respect to the fourth-most-significant bit (and all subsequent bits), then, lead 657 is low. This prevents gate 661 from pulling lead 159 low no matter what the subsequent bit values on lead 621. That is, circuit 650 has dropped out of arbitration.

Assume, on the other hand, that the squared magnitude in store 620 is, in fact, the largest over all. In this case one or the other of leads 659 and 665 will always be low (as in the above examples with respect to the most- and second-most-significant bits) and circuit 650 remains in the arbitration to the end. Store 620 thereafter continues to receive shift pulses, causing the advance/retard signal on lead 641, which has been shifted into each stage of store 620 as the squared magnitude bits have been shifted out, to appear on lead 621. Since lead 657 is high, a) the advance/retard bit value now being shifted onto lead 621 controls the state of lead 159 and b) the outputs of ROM 640 on leads 642 and 643 control the states of leads 157 and 158 via NAND gates 637 and 638, respectively. At this time, receiver timing generator 135 (FIG. 1) responds to the signals on leads 157–159 to effect the timing adjustment.

If the largest squared magnitude appears in two or more timing recovery circuits, each of their arbitration circuits will attempt to control the states of leads 157–159. As a result, as long as any one of those arbitration circuits specifies a "0" for a particular one of leads 157–159, that lead will, in fact, carry a "0" irrespective of the signals on the other two leads. This may result in an occasional erroneous timing adjustment. Such erroneous adjustments, however, will typically have no significant effect on long term timing recovery. Moreover, the possible deleterious effects of such erroneous timing adjustments can be mitigated by pairing up the various possible signal combinations on leads 157 and 158 with the various timing adjustment increment magnitudes in such a way that the smaller magnitudes are represented by signals having more "0"s, e.g., $\Delta T=00$, $3\Delta T=01$, $5\Delta T=10$, $7\Delta T=11$. In this way, the magnitude of any erroneous timing adjustment will be no larger than the smallest adjustment specified by any of the competing timing recovery circuits.

The foregoing merely illustrates the principles of the invention. For example, although FIG. 5 depicts a particular scheme relating timing adjustment increment magnitude to distance from the reference location, numerous other schemes are possible. These may include, for example, schemes in which (a) the same increment magnitude is associated with two or more adjacent coefficient locations (b) the difference between successively larger increment magnitudes is a constant other than $2\Delta T$ or is other than a constant or (c) the increment magnitude does not monotonically increase with distance from the reference location.

In addition, although the reference coefficient is identified each time the coefficients are updated, this may be done less often, if desired. Moreover, the invention can be employed in equalizers using any known coefficient updating rule and with other than T/2 sample spacing, e.g., 3T/4, T/4, 2T/3, etc.

It should thus be appreciated that those skilled in the art will be able to devise various arrangements which, although not specifically shown or described herein, embody the principles of the invention and which, therefore, do not depart from its spirit and scope.

I claim:

1. Apparatus comprising means (120, 125, 135) for forming samples of a received signal which represents a succession of data symbols,
    means (155, 160, 165, 222, 226, 233) for forming a decision as to the value of each one of said symbols as a function of the sum of the products of ones of an ordered plurality of coefficients with respective ones of said samples, and
    means (160, 165, 170, 222, 226, 233) for updating the values of said coefficients,
    characterized by timing recovery means (230) for adjusting the phase of said sample forming means by an amount having a magnitude which is a function of the distance in said ordered plurality between the location of one of said coefficients in said ordered plurality and a predetermined second location.

2. The invention of claim 1 wherein said magnitude is an increasing function of said distance over at least a range of distances from said second location.

3. The invention of claim 2 wherein said timing recovery means adjusts said phase in a direction determined by the relative positions in said ordered plurality of said one coefficient location and said second location.

4. The invention of claims 1 or 3 wherein said one coefficient is the one of said coefficients having the largest magnitude.

5. The invention of claims 1 or 3 wherein said data symbols are transmitted at a predetermined symbol rate and wherein said samples are formed in excess of said rate.

6. The invention of claim 5 wherein said one coefficient is the one of said coefficients having the largest magnitude.

7. Apparatus comprising
    means (120, 125, 135) for forming samples of a received signal which represents a succession of data signal values,
    means (155, 160, 165, 222, 226, 233) for forming a decision as to the value of each one of said data signal values as a function of the sum of the products of an ordered plurality of coefficients with respective ones of said samples,
    means (160, 165, 170, 222, 226, 233) for updating the values of said coefficients, and
    timing recovery means (230) for adjusting the phase of said sample forming means in a direction determined by the location in said ordered plurality of an identified one of said coefficients,
    said timing recovery means characterized in that the magnitude of said phase adjustment is a function of said location.

8. The invention of claim 7 wherein said magnitude is a function of the distance in said ordered plurality between said location of said identified coefficient and a predetermined second location.

9. The invention of claim 8 wherein said magnitude is an increasing function of said distance over at least a range of distances from said second location.

10. The invention of claim 9 wherein said timing recovery means retards said phase if said identified coefficient is within a first predetermined portion of said ordered plurality and advances said phase if said identified coefficient is within a second predetermined portion of said ordered plurality.

11. The invention of claims 7, 8, 9 or 10 wherein said identified coefficient is the one of said coefficients having the largest magnitude.

12. The invention of claims 7, 8, 9 or 10 wherein said data signal values are transmitted at a predetermined rate and wherein said samples are formed in excess of said rate.

13. The invention of claim 11 wherein said data signal values are transmitted at a predetermined rate and wherein said samples are formed in excess of said rate.

14. Apparatus comprising
    means (120, 125, 135) for forming samples of a received signal which represents a succession of data symbols,
    circuit means (221, 222, 226, 233, 241, 261) for periodically multiplying ones of said samples by respective ones of an ordered plurality of coefficients and for forming the sum of the resulting products, each of said ones of said samples bearing a predetermined temporal relationship to the most recently formed one of said samples,
    means (155, 160, 165) for forming decisions as to the values of individual ones of said symbols in response to respective sums formed by said circuit means,
    means (160, 165, 170, 222, 226, 233) for forming error signals each associated with a respective one of said decisions and for modifying the values of said coefficients in response to at least ones of said error signals, and
    timing recovery means (230) for repetitively adjusting the phase of said sample forming means to retard or advance same as a function of whether an individual one of said coefficients having the largest magnitude is within first or second predetermined portions of said ordered plurality, respectively,
    characterized in that the magnitude of the amount by which said timing recovery means adjusts said phase is a function of the location of said one of said coefficients within said ordered plurality.

15. The invention of claim 14 wherein said magnitude is a function of the distance between the point in said ordered plurality at which said one of said coefficients is located and a point intermediate said first and second portions.

16. The invention of claim 15 wherein said magnitude is an increasing function of said distance over at least a range of distances from said intermediate point.

17. The invention of claims 14, 15 or 16 wherein the coefficients of said first predetermined portion are those which are multiplied in said multiplying means by the more recently formed ones of said samples and the coefficients of said second predetermined portion are those which are multiplied in said multiplying means by the less recently formed ones of said samples.

18. The invention of claim 17 wherein said data symbols are transmitted at a predetermined symbol rate and wherein said samples are formed in excess of said rate.

19. Apparatus for use in a receiver to which a data signal representing a succession of data signal values is transmitted comprising
   (a) means (120, 125, 135) for forming samples of said data signal, and
   (b) signal processing means operative during each one of a succession of predetermined time intervals including
      means (221, 222, 226, 233, 241, 261) for multiplying ones of said samples with respective ones of a queue of coefficients and for forming the sum of the resulting products, said ones of said samples each bearing a predetermined temporal relationship to the most recently formed one of said samples and each of said coefficients having a predetermined value associated with said one of said intervals,
      means (155, 160, 165, 170) responsive to said sum for forming a decision as to an individual one of said data signal values and for forming a corresponding error signal, and
      means (222, 226, 233) for determining in response to said error signal at least ones of the coefficient values associated with a subsequent one of said intervals,
   (c) characterized by means (230) operative during at least selected ones of said intervals for adjusting the phase of said sample forming means, the direction of the phase adjustment being determined by the location in said queue of the then largest one of said coefficients relative to a predetermined reference location in said queue and the magnitude of said phase adjustment being determined by the distance between said largest coefficient location and said reference location.

20. The invention of claim 19 wherein said magnitude is an increasing function of said distance over at least a range of distances from said reference location.

21. The invention of claims 19 or 20 wherein each of said coefficients is comprised of at least first and second components and wherein said largest coefficient is one of said coefficients for which the sum of the squares of its components is the largest.

22. A method comprising the steps of
   forming samples of a received signal which represents a succession of data symbols,
   forming a decision as to the value of each one of said symbols as a function of the sum of the products of ones of an ordered plurality of coefficients with respective ones of said samples, and
   updating the values of said coefficients,
   characterized by the step of adjusting the phase with which said samples are formed by an amount having a magnitude which is a function of the distance in said ordered plurality between the location of one of said coefficients in said ordered plurality and a predetermined second location.

23. The invention of claim 23 wherein said magnitude is an increasing function of said distance over at least a range of distances from said second location.

24. The invention of claim 23 wherein said phase is adjusted in a direction determined by the relative positions in said ordered plurality of said one coefficient location and said second location.

25. The invention of claims 22 or 24 wherein said one coefficient is the one of said coefficients having the largest magnitude.

26. The invention of claims 22 or 24 wherein said data symbols are transmitted at a predetermined symbol rate and wherein said samples are formed in excess of said rate.

27. The invention of claim 26 wherein said one coefficient is the one of said coefficients having the largest magnitude.

28. A method comprising the steps of
   forming samples of a received signal which represents a succession of data signal values,
   forming a decision as to the value of each one of said data signal values as a function of the sum of the products of an ordered plurality of coefficients with respective ones of said samples,
   updating the values of said coefficients, and
   adjusting the phase with which said samples are formed in a direction determined by the location in said ordered plurality of an identified one of said coefficients,
   characterized in that the magnitude of said phase adjustment is a function of said location.

29. The invention of claim 28 wherein said magnitude is a function of the distance in said ordered plurality between said location of said identified coefficient and a predetermined second location.

30. The invention of claim 29 wherein said magnitude is an increasing function of said distance over at least a range of distances from said second location.

31. The invention of claim 30 wherein said phase is retarded if said identified coefficient is within a first predetermined portion of said ordered plurality and said phase is advanced if said identified coefficient is within a second predetermined portion of said ordered plurality.

32. The invention of claims 28, 29, 30 or 31 wherein said identified coefficient is the one of said coefficients having the largest magnitude.

33. The invention of claims 28, 29, 30 or 31 wherein said data signal values are transmitted at a predetermined rate and wherein said samples are formed in excess of said rate.

34. The invention of claim 32 wherein said data signal values are transmitted at a predetermined rate and wherein said samples are formed in excess of said rate.

35. A method comprising the steps of
   forming samples of a received signal which represents a succession of data symbols,
   periodically multiplying ones of said samples by respective ones of an ordered plurality of coefficients and forming the sum of the resulting products, each of said ones of said samples bearing a predetermined temporal relationship to the most recently formed one of said samples,
   forming decisions as to the values of individual ones of said symbols in response to respective ones of the sums thus formed, forming error signals each associated with a respective one of said decisions and modifying the values of said coefficients in response to at least one of said error signals, and repetitively adjusting the phase with which said samples are formed to retard or advance same as a function of whether an individual one of said coefficients having the largest magnitude is within first or second predetermined portions of said ordered plurality, respectively, characterized in that the magnitude of the amount by which said timing recovery means adjusts said phase is a function of the location of said one of said coefficients within said ordered plurality.

36. The invention of claim 35 wherein said magnitude is a function of the distance between the point in said ordered plurality at which said one of said coefficients is located and a point intermediate said first and second portions.

37. The invention of claim 36 wherein said magnitude is an increasing function of said distance over at least a range of distances from said intermediate point.

38. The invention of claims 35, 36 or 37 wherein the coefficients of said first predetermined portion are those which are multiplied in said multiplying step by the more recently formed ones of said samples and the coefficients of said second predetermined portion are those which are multiplied in said multiplying step by the less recently formed ones of said samples.

39. The invention of claim 33 wherein said data symbols are transmitted at a predetermined symbol rate and wherein said samples are formed in excess of said rate.

40. A method for use in a receiver to which a data signal representing a succession of data signal values is transmitted, said method comprising the steps of (a) forming samples of said data signals, and
(b) during each one of a succession of predetermined time intervals multiplying ones of said samples with respective ones of a queue of coefficients and forming the sum of the resulting products, said ones of said samples each bearing a predetermined temporal relationship to the most recently formed one of said samples and each of said coefficients having a predetermined value associated with said one of said intervals, forming in response to said sum a decision as to an individual one of said data signal values and a corresponding error signal, and determining in response to said error signal at least ones of the coefficient values associated with a subsequent one of said intervals, (c) characterized by the step of adjusting the phase with which said samples are formed during at least selected ones of said intervals, the direction of the phase adjustment being determined by the location in said queue of the then largest one of said coefficients relative to a predetermined reference location in said queue and the magnitude of said phase adjustment being determined by the distance between said largest coefficient location and said reference location.

41. The invention of claim 40 wherein said magnitude is an increasing function of said distance over at least a range of distances from said reference location.

42. The invention of claims 40 or 41 wherein each of said coefficients is comprised of at least first and second components and wherein said largest coefficient is one of said coefficients for which the sum of the squares of its components is the largest.

* * * * *